(12) United States Patent
Myklebust

(10) Patent No.: US 12,553,490 B2
(45) Date of Patent: Feb. 17, 2026

(54) VIBRATION DAMPER

(71) Applicant: Vibracoustic SE, Darmstadt (DE)

(72) Inventor: Erik Myklebust, Kongsberg (NO)

(73) Assignee: Vibracoustic SE, Weinheim (DE)

( * ) Notice: Subject to any disclaimer, the term of this patent is extended or adjusted under 35 U.S.C. 154(b) by 0 days.

(21) Appl. No.: 17/844,112

(22) Filed: Jun. 20, 2022

(65) Prior Publication Data

US 2022/0403903 A1    Dec. 22, 2022

(30) Foreign Application Priority Data

Jun. 21, 2021   (DE) ............... 10 2021 116 027.8

(51) Int. Cl.
*F16F 7/104* (2006.01)
*F16F 7/00* (2006.01)

(52) U.S. Cl.
CPC .......... *F16F 7/104* (2013.01); *F16F 2222/08* (2013.01); *F16F 2230/007* (2013.01); *F16F 2234/02* (2013.01)

(58) Field of Classification Search
CPC ... F16F 7/104; F16F 2222/08; F16F 2230/007
See application file for complete search history.

(56) References Cited

U.S. PATENT DOCUMENTS

| | | | |
|---|---|---|---|
| 3,596,924 A | 8/1971 | Watts | |
| 10,626,945 B2 * | 4/2020 | Gebhardt | F16F 1/3732 |
| 2019/0186577 A1 * | 6/2019 | Back | F16F 7/108 |
| 2019/0360549 A1 * | 11/2019 | Sohn | F16F 7/108 |
| 2019/0383344 A1 | 12/2019 | Roeda | |
| 2020/0278007 A1 * | 9/2020 | Gustavsson | F16F 1/3732 |
| 2022/0024271 A1 * | 1/2022 | Katamura | F16F 7/108 |

FOREIGN PATENT DOCUMENTS

| | | |
|---|---|---|
| CN | 103144727 A | 6/2013 |
| CN | 109642631 A | 4/2019 |
| DE | 102016115782 B4 | 6/2019 |

(Continued)

OTHER PUBLICATIONS

German Examination Report, 102021116027.8, dated Feb. 14, 2022.
(Continued)

*Primary Examiner* — Melody M Burch
(74) *Attorney, Agent, or Firm* — Fishman Stewart PLLC

(57) ABSTRACT

A vibration damper for damping vibrations of a motor vehicle component is disclosed. The vibration damper is passed through by a transverse center plane, and the vibration damper includes a retention apparatus that can be fixed to a motor vehicle component. In embodiments, the vibration damper has at least two receptors that each have an inner side facing the transverse center plane and an outer side facing away from the transverse center plane, has a damper mass with a central longitudinal axis, and has at least two elastomer springs. In embodiments, the elastomer springs couple the damper mass to the receptors with an ability to vibrate, and at least one of the elastomer springs has a connection portion, between the damper mass and respective receptor, that extends at least mainly externally with respect to the respective receptor.

15 Claims, 17 Drawing Sheets

(56) References Cited

FOREIGN PATENT DOCUMENTS

| | | |
|---|---|---|
| DE | 102018112983 A1 | 12/2019 |
| DE | 102019112108 A1 | 11/2020 |
| EP | 3467334 A1 | 4/2019 |
| EP | 3524846 A1 | 8/2019 |
| JP | H1030677 A | 2/1998 |
| JP | 2018044397 A | 3/2018 |

OTHER PUBLICATIONS

European Search Report, 22174954.2, dated Nov. 23, 2022.
Chinese Search Report, CN202210673401.8, dated May 8, 2025 (w_machine_translation).

* cited by examiner

VIBRATION DAMPER

CROSS-REFERENCE TO RELATED APPLICATIONS

This application claims priority to German Patent Application No. DE 10 2021 116 027.8, filed Jun. 21, 2021, the contents of which are hereby incorporated by reference in its entirety.

TECHNICAL FIELD

The invention relates to vibration dampers, including vibration dampers and assemblies for damping vehicle vibrations.

BACKGROUND

Known vibration dampers for damping vibrations of a motor vehicle component generally comprise a retention apparatus which can be fixed to the motor vehicle component, a damper mass which is supported with an ability to oscillate relative to the retention apparatus and a resilient apparatus which couples the damper mass to the retention apparatus with an ability to oscillate.

Vibration dampers of the type mentioned in the introduction are used to damp the vibrations of motor vehicle components in order to decouple the disruptive vibrations from the passenger compartment and thus to improve the driving comfort. Conventional vibration dampers have a resilient apparatus and a damper mass which is coupled via the resilient mass to the motor vehicle component which is intended to be damped with an ability to oscillate. If the motor vehicle component which is connected to the vibration damper begins to vibrate, the vibration damper also oscillates with a specific delay, wherein a damping of the vibrations is brought about via the resilient apparatus. Such a vibration damper may be used, for example, to damp vibrations in the region of a rear flap, a vehicle seat, or a roof of a motor vehicle.

Such a vibration damper is known, for example, from DE 102016115782 B4. The damper mass therein has a separate pin element at each front side. The pin element is connected at one end to the damper mass via a fixing portion and projects at the other end deeply into a hollow-cylindrical portion of a connecting elastomer spring. The pin element further projects through a stop device which is in the form of a receiving lug in order to limit a redirection of the damper mass relative to the retention apparatus. However, such a vibration damper can be cost-intensive to produce as a result of the number of components and where applicable necessary special assembly tools, requires a precise predefined pretensioning and takes up a large amount of structural space at least in a longitudinal direction.

Therefore, an object of the invention is to provide vibration dampers that address and/or overcome challenges associated with the prior art.

SUMMARY

Features and embodiments of the present concept are disclosed herein.

Therefore, there is proposed according to an embodiment of the invention a vibration damper, for damping vibrations of a motor vehicle component, which is passed through by a transverse center plane, having a retention apparatus which can be fixed to the motor vehicle component and which has at least two receptors (each of which may include or comprise a receiving means), which each have an inner side facing the transverse center plane and an outer side facing away from the transverse center plane, and having a damper mass which is passed through centrally by a longitudinal axis, and having at least two elastomer springs, wherein the elastomer springs couple the damper mass to the receptors with an ability to vibrate, wherein at least one of the elastomer springs has a connection portion, between the damper mass and respective receptor, which extends at least mainly externally with respect to the respective receptor.

The connection portion can also extend completely externally with respect to the respective receptor or the exterior thereof. The connection portion may extend directly between the damper mass and the respective receptor, without any interposition of a pin element. Therefore, the damper mass may be supported directly on the retention apparatus. Furthermore, such connection portion may not be arranged in the intermediate space of both retention apparatuses but instead at least partially at the outer side. This is because, in such an embodiment, a previously necessary additional pin element can be dispensed with in that the damper mass itself may act as a redirection or path limiting device.

The invention may also have substantial differences from known embodiments with respect to the location of the damping effect. The stiffness of a vibration damper may be substantially determined by the structural configuration and location of the elastomer springs. Previously, a damping effect or a large part of the resilient stiffness may result from an elastomer spring portion which is positioned in the intermediate space of both retention apparatuses. The connections of the elastomer springs to the damper mass or the pin element are consequently located close together in the longitudinal direction, which may lead to great cardanic redirections and great stop forces. With embodiments of the invention, however, the damping effect or a large part of the resilient stiffness may be produced in the connection portion which may be arranged externally with respect to the respective receptor. The cardanic behavior is thereby also improved.

By a pin element being dispensed with, the vibration damper can further be constructed to be shorter in a longitudinal direction. The damper mass, per se, can further have a very simple geometry. Previously, for example, bores were necessary in the damper mass in order to fix the pin element therein. The damper mass may be, for example, in the form of a cylinder with a consistent diameter along the longitudinal axis and with planar front sides, or may also be configured in a polygonal manner in cross section, such as a parallelepiped with planar front sides.

Furthermore, vibration dampers according to embodiments of the invention can be produced simply and cost-effectively because the elastomer springs can be produced separately from the damper mass and retention apparatus. Consequently, a modular system which can be combined with different damper masses and/or retention apparatuses can be generated. Furthermore, the vibration frequency of the vibration damper can be adjusted by the hardness of the elastomer springs and/or the configuration of the geometry thereof.

Consequently, vibrations that result from a motor vehicle component may be effectively damped so that the driving comfort may be increased.

The elastomer springs may be connected to the damper mass and the respective retention apparatus in a positive-locking, non-positive-locking, and/or materially engaging manner. One of the elastomer springs can be associated with each receptor. Each receptor can be configured in a plate-like and/or annular manner and/or extend parallel with the transverse center plane, wherein this plate-like and/or annular receptor may have the inner side and the outer side.

According to an embodiment of the vibration damper, the damper mass may be in the form of a cylinder with a consistent diameter along the longitudinal axis and may have planar front sides. However, the damper mass may also be configured in a polygonal manner in cross section, such as in the form of a parallelepiped with planar front sides. The front sides are directed in a longitudinal direction. The damper mass may be constructed monolithically or may be formed in a single piece.

According to an embodiment of the vibration damper, the respective connection portion can circumferentially surround the damper mass. At least the damper mass can be covered by the connection portion between the front side thereof and the receptor. The respective connection portion may be configured in a hollow-cylindrical manner.

According to an embodiment of the vibration damper, the receptors can each be in the form of a receiving lug, wherein the damper mass can project through at least one of the receiving lugs, and preferably both lugs, in the longitudinal direction with a radial spacing being formed. The outer side and inner side can then relate to the receiving lug. Consequently, the connection portion of the elastomer spring can extend at least partially at the outer side of the respective receiving lug. The radial spacing may be circumferential. A free space which surrounds the damper mass can be constructed in the receiving lug around the damper mass, for example, a circular ring-shaped free space in the case of a damper mass which is circular in cross section and a receiving lug which is circular in cross section. A path limiting device may also be formed and prevent an overload of the elastomer springs by limiting the redirection of the damper mass relative to the retention apparatus. This may be because the damper mass can subsequently itself act as a radial limitation. In particular, this embodiment causes the damper mass to be able to move freely only within predetermined paths in order to damp the vibrations without excessively powerfully loading or damaging the elastomer springs in this instance. The receiving lug may be orientated coaxially relative to the damper mass. The damper mass may itself project through the receiving lugs, instead of a pin element previously used for such, and a great region may be provided with the circumferential face of the damper mass for a redirection limitation in order to improve the durability in comparison with the small pin element.

According to an embodiment of the vibration damper, the receiving lugs may be greater than the damper mass at the maximum cross sectional extent thereof.

According to an embodiment of the vibration damper, at least one receiving lug may be circular in cross section. The damper mass in the portion which projects through the receiving lug may also be circular in cross section. Alternatively, at least one receiving lug can be polygonal in cross section. The damper mass may also be polygonal in cross section in the portion which projects through the receiving lug. The respective corners of the damper mass and receiving lug can be located on a median line which intersects with the longitudinal axis. The median line can extend parallel with the transverse center plane. A notional cross sectional circle, the center of which can be located on the longitudinal axis and on which the corners of the damper mass are located in the region of the respective receiving lug, may be greater than the smallest notional cross sectional circle which fits in the respective receiving lug, wherein the two cross sectional circles may be concentric. A rotation prevention member about the longitudinal axis can thereby be produced.

According to an embodiment of the vibration damper, each elastomer spring may have a front side portion for applying against a front side of the damper mass and the connection portion which projects therefrom in the direction of the transverse center plane in order to couple to the respective receptor. The elastomer springs consequently may also stiffen the vibration damper in the longitudinal direction because the front side portion thereof adjoins the front side of the damper mass. The front side portions may fix the damper mass in the longitudinal direction. Furthermore, the front side portion can cooperate in a buffering manner with an axial stop element, for example, an axial stop lip, in order to limit an axial redirection.

According to an embodiment of the vibration damper, each elastomer spring may have a circumferential side portion which is arranged in a radial direction so as to surround the damper mass and/or which is connected thereto. The circumferential side portion may follow the circumferential face of the damper mass, for example, it may be annular and may directly adjoin the outer circumference of the damper mass or be connected at that location. The circumferential side portions fix the damper mass in a transverse or radial direction. Consequently, the damper mass may also be secured circumferentially, wherein such a configuration was not previously possible with a pin element at the front side. The connection between the circumferential side portion and damper mass may be a positive-locking, non-positive-locking, and/or materially engaging connection, such as a press-fit. In that the damper mass is also supported circumferentially on the elastomer springs, the vibration damper can be constructed to be shorter in a longitudinal direction. The circumferential side portion may directly adjoin the front side portion. The circumferential side portion may be a portion of the connection portion. The elastomer spring can engage over the damper mass in the manner of a cover via the front side portion and circumferential side portion.

According to an embodiment of the vibration damper, the damper mass can be covered completely at the front side and/or at the circumference by the elastomer spring at the longitudinal ends thereof at the outer side of the exterior of the receptor.

According to an embodiment of the vibration damper, the connection portion can have at least partially an internal diameter which increases in the direction of the outer side of the respective receptor. The portion of the connection portion with an increasing internal diameter can also be referred to as a radial spacing portion because the respective elastomer spring moves increasingly away from the damper mass in a radial direction. The corresponding external diameter of the connection portion can also change to the same extent. Thus, a constant wall thickness can be produced. The portion which increases the internal diameter can extend in a tilted or curved manner relative to the circumferential face of the damper mass. A tilted extent may form, for example, a conical portion.

According to an embodiment of the vibration damper, the connection portion may have a coupler (which may include or comprise a coupling means), such as a circumferential groove, for coupling to the respective receptor, wherein the coupler may be arranged between the receptors and the damper mass in the radial direction. The portion of the elastomer spring at the inner circumference of the circumferential groove may form an elastomer radial stop for the damper mass. The coupler may be the circumferential groove or a circumferential flange, wherein the receptors can comprise the other element for coupling, respectively.

According to an embodiment of the vibration damper, each elastomer spring may have a first flange, against which the respective receptor can adjoin, wherein the first flange may have a side wall which increases in terms of diameter in the direction of the transverse center plane and the respective receptor may have a corresponding contour in the abutment region which adjoins the side wall. The first flange may be an annular flange. The first flange may extend at the outer circumference. A side wall which is configured in this manner can deform the elastomer spring during axial displacement of the damper mass in such a manner that the first flange may be bent radially inwardly, where it forms a radial stop and reduces a radial deflection path.

According to an embodiment of the vibration damper, the first flange may have at the external circumference a flat portion which reduces a radial extent of the first flange with respect to portions of the first flange which are adjacent at the circumference. The flat portion may reduce the radial structural height of the first flange. The elastomer spring can thereby be moved nearer a carrier plate, whereby less structural space may be required. Consequently, a radially more compact construction type can be brought about. The flat portion may be planar.

According to an embodiment of the vibration damper, each elastomer spring may have a second flange, against which the respective receptor can adjoin, wherein the second flange may have a side wall which extends in the radial direction and against which the receptor may be supported in the longitudinal direction. The second flange may be an annular flange. The second flange may extend at the external circumference. A side wall configured in this manner may act as an axial stop in the event of axial displacement of the damper mass. The side wall may extend parallel with the transverse center plane.

According to an embodiment of the vibration damper, the circumferential groove can be formed by the first and/or second flange and/or be limited in the longitudinal direction.

According to an embodiment of the vibration damper, the retention apparatus may comprise no structure which connects the receptors to each other or have a carrier plate which can connect the receptors to each other, wherein the carrier plate can be either constructed integrally with the receptors or constructed separately therefrom and can be connected thereto, such as using at least one form-fit and/or press-fit, or have at least one cable which can tension the receptors with respect to each other.

In a first alternative, the two receptors, may be constructed separately and not connected (directly) to each other via a structure, apart from, for example, the indirect connection using the damper mass which is carried by the two members. This may be particularly advantageous during preassembly because the receptors can be arranged in the longitudinal direction with the elastomer springs being intermediately connected to the damper mass. Furthermore, the receptors may be part or a portion of a simple L-shaped angled member which can also be produced in a cost-effective manner, wherein the portions of the L-shaped angled member may be referred to as the base line and arm.

In a second alternative, a carrier plate, which is integral with or separate from the receptors, can be provided. In the integral configuration, the two receptors and the carrier plate can be constructed monolithically or in one piece. In the separate configuration, there are three components which can be connected to each other in a suitable manner, for example, by screwing or clamping. A defined pressure on the elastomer springs can be maintained using the carrier plate, as early as during the preassembly.

The carrier plate can already hold together the parts of the vibration damper in the preassembly state, particularly during subsequent transport for the definitive assembly on the motor vehicle component. In this case, the preassembly may also be extremely simple. As it were in the same manner as in the first alternative, the receptors can, in the case of the separate configuration, be arranged in a longitudinal direction with the elastomer springs being intermediately connected to the vibration damper and can subsequently be connected using the carrier plate. This can allow an axial limiter to be arranged near the damper mass or an axial stop lip because great expansions of the elastomer springs are not necessary during the preassembly or assembly.

In a third alternative, a cable may be provided, wherein a wire is also intended to be understood thereby. The cable may be a cable with or without small resilient portions. The cable may be a ring cable and may tension the two receptors with respect to each other. This may be particularly advantageous for the preassembly state, transport and rapid assembly. The cable can be suspended on a receptor and then be guided to the other receptor. The cable may be guided back to the other receptor again from there in a crossed state and suspended at that location. The cable can produce a pretension together with the elastomer springs. The cable itself does not constitute a rotation prevention member for the damper mass about the longitudinal axis. However, this may be simply of lesser importance in the case of a damper mass with an individual rotation prevention member as the shape of the damper mass, which may be polygonal in cross section, can itself form a rotation prevention member with a corresponding receptor.

According to an embodiment of the vibration damper, the separate carrier plate may have at least one clamping bracket which extends in the longitudinal or transverse direction. The clamping bracket can clamp with a receptor or a leg which is arranged thereon, and preferably with a clamping bridge. The separate carrier plate may have two clamping brackets which extend in a transverse direction with respect to the longitudinal axis, wherein one of the clamping brackets clamps may have a receptor or a leg which is arranged thereon. All the clamping brackets may be directed in the same direction. A simple and rapid preassembly of the vibration damper can thereby be carried out. The clamping bracket can clamp a leg or introduce a pretension at that location during preassembly or assembly, particularly when the leg is tilted through an angle in the preassembly state.

According to an embodiment of the vibration damper, the separate carrier plate may have at least one locking projection which extends in the longitudinal or transverse direction. The locking projection can lock with a locking recess of a receptor or a leg which may be arranged thereon. The separate carrier plate may have two locking projections which extend in the transverse direction with respect to the longitudinal axis, wherein one of the locking projections locks with a receptor or a leg which is arranged thereon. A simple and rapid preassembly of the vibration damper can thereby be carried out. The locking projections can lock with respective locking recesses. It is also conceivable for the separate carrier plate to have the locking recess and the receptor or the leg which is arranged thereon to have a corresponding locking projection. The locking projection may act as an axial limiting member in order to prevent the axial displacement of the respective receptor or a leg which is arranged thereon.

According to an embodiment of the vibration damper, a leg which projects in the longitudinal direction can be arranged on at least one of the receptors and extends in a manner tilted through an angle with respect to the longitudinal axis and/or has an axial stop lip which projects from the respective leg and/or has at least one clamping recess for introducing a clamping bracket and/or has at least one locking recess for receiving a locking projection.

In principle, the legs can be used for connection to a motor vehicle component. The leg may be the arm of an L-shaped angled member. With respect to a first configuration, the angle or the enclosed angle may be in the range between 1° and 20°, preferably between 5° and 15°, and may preferably be 10°. The angle may be present in the unloaded state or state before preassembly. An angle in the range from 89° to 70°, preferably between 85° and 75°, preferably 80°, can alternatively or additionally be defined between a base line portion and an arm portion in the case of an L-shaped angled member. The legs being connected to the motor vehicle component may lead to the receptors being able to be bent and thus a pretension being able to be introduced into the vibration damper.

With respect to a second configuration, the axial stop lip can extend in the direction of the longitudinal axis, such as parallel with the transverse center plane. The damper mass can strike the axial stop lip in the case of great redirections in a longitudinal direction, wherein here a front side portion made of elastomer material for damping may be advantageous. The axial stop lip can be monolithically formed with the respective leg, and may be stamped.

With respect to a third configuration, the at least one clamping recess can extend in a transverse direction. Each leg may have a clamping recess which extends in the transverse direction with respect to the longitudinal axis, wherein one of the clamping brackets can be received in a clamping recess, respectively. Two clamping recesses which extend in the transverse direction with respect to the longitudinal axis in each receptor or a leg which is arranged thereon may be advantageous. The two clamping recesses of a receptor or a leg which is arranged thereon can be aligned with each other and/or be separated by a clamping bridge. The clamping bridge can be constructed by the respective receptor or the leg which is arranged thereon. The clamping bracket can adjoin the clamping bridge in a clamping manner.

With respect to a fourth configuration, at least one leg may have a locking recess for a locking projection, wherein the locking recess can extend in the longitudinal or transverse direction. Each of the two receptors or the leg which is arranged thereon may have a locking recess which extends in the transverse direction with respect to the longitudinal axis, wherein one of the locking recesses can clamp with respect to the carrier plate. A simple and rapid preassembly of the vibration damper can thereby be carried out. It is also conceivable for the separate carrier plate to have the locking recess and the receptor or the leg which is arranged thereon to have the corresponding locking projection.

BRIEF DESCRIPTION OF THE DRAWINGS

Additional features, details and advantages of the invention will be appreciated from the wording of the claims and the following description of embodiments with reference to the drawings, in which:

DETAILED DESCRIPTION

Figure 1:
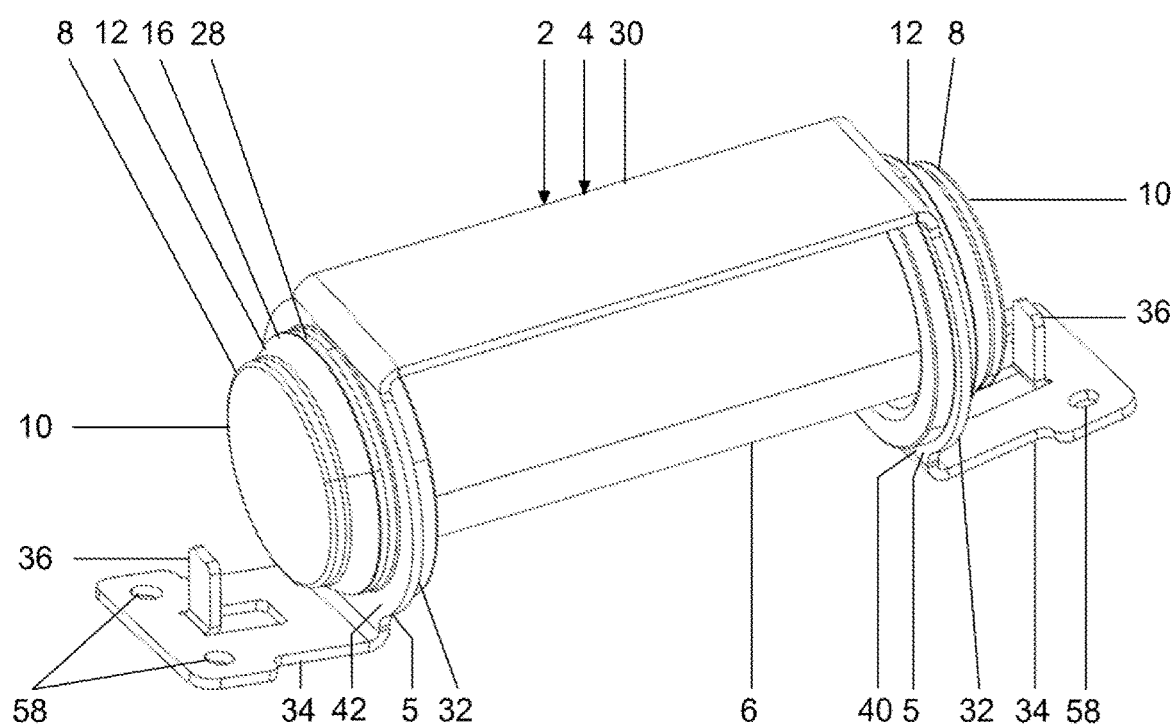
Figure 2:
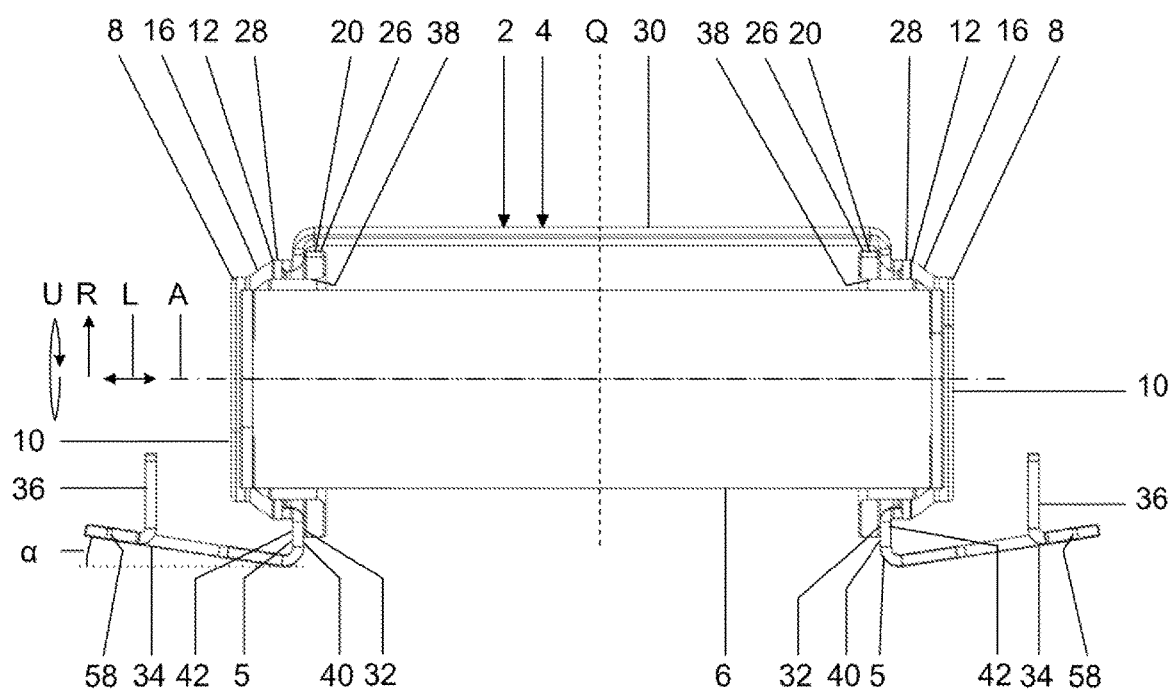
Figure 3:
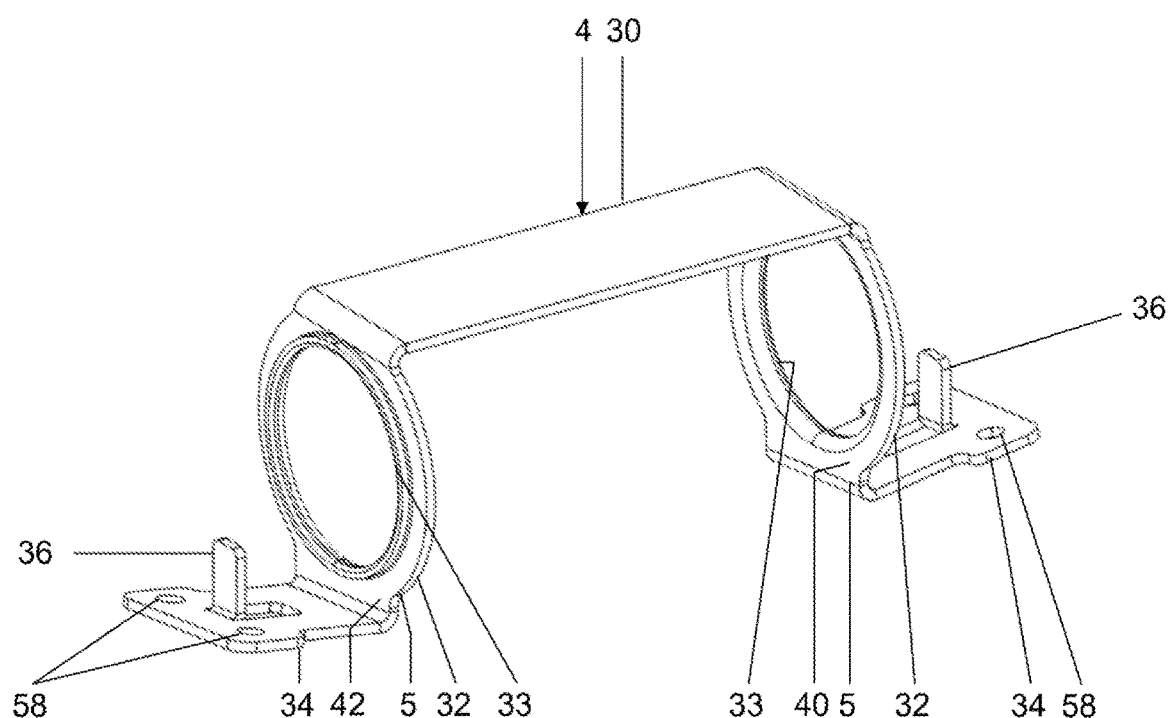
Figure 4:
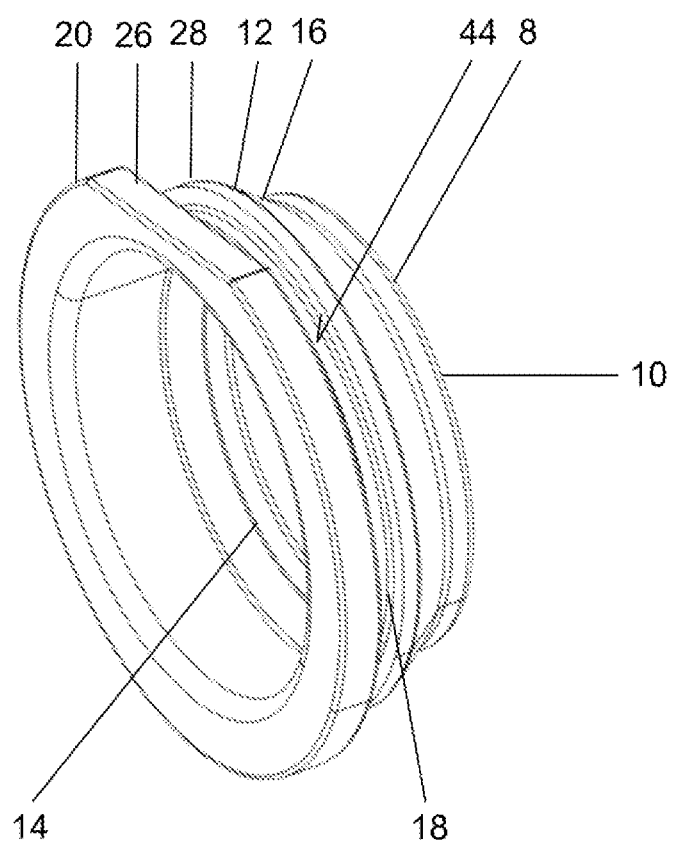
Figure 5:
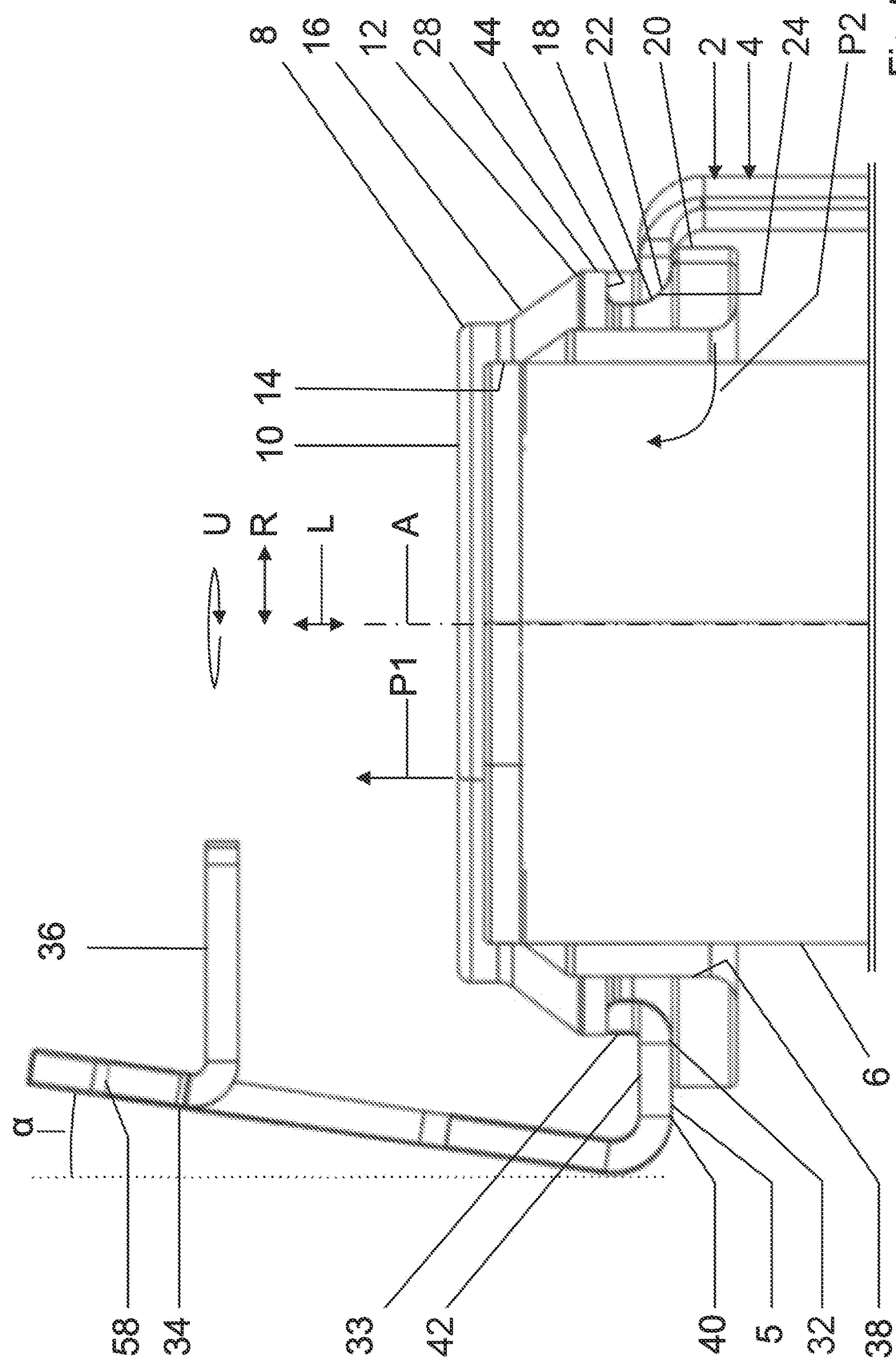
Figure 6:
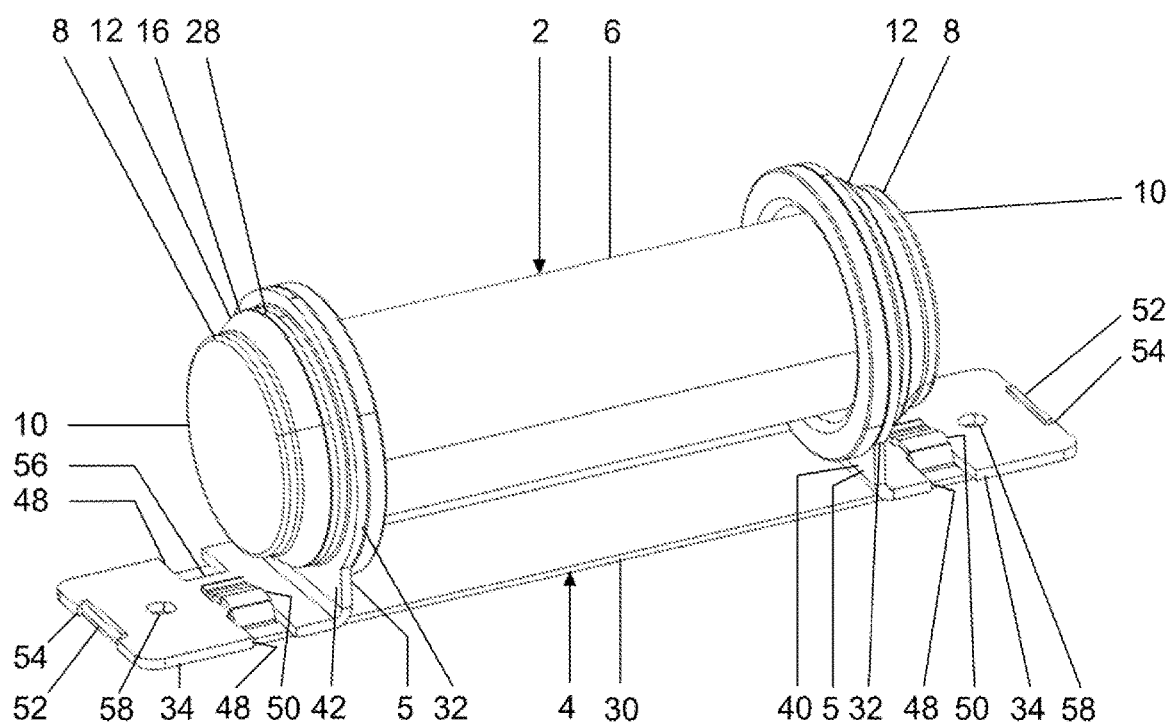
Figure 7:
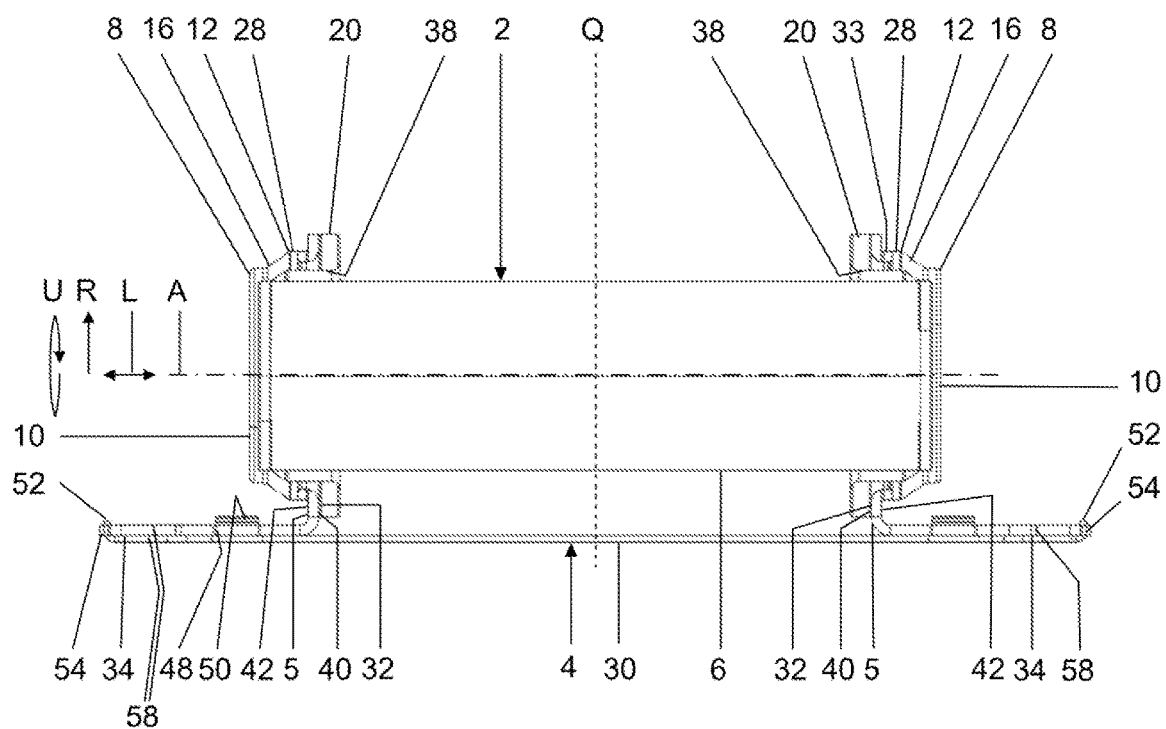
Figure 8:
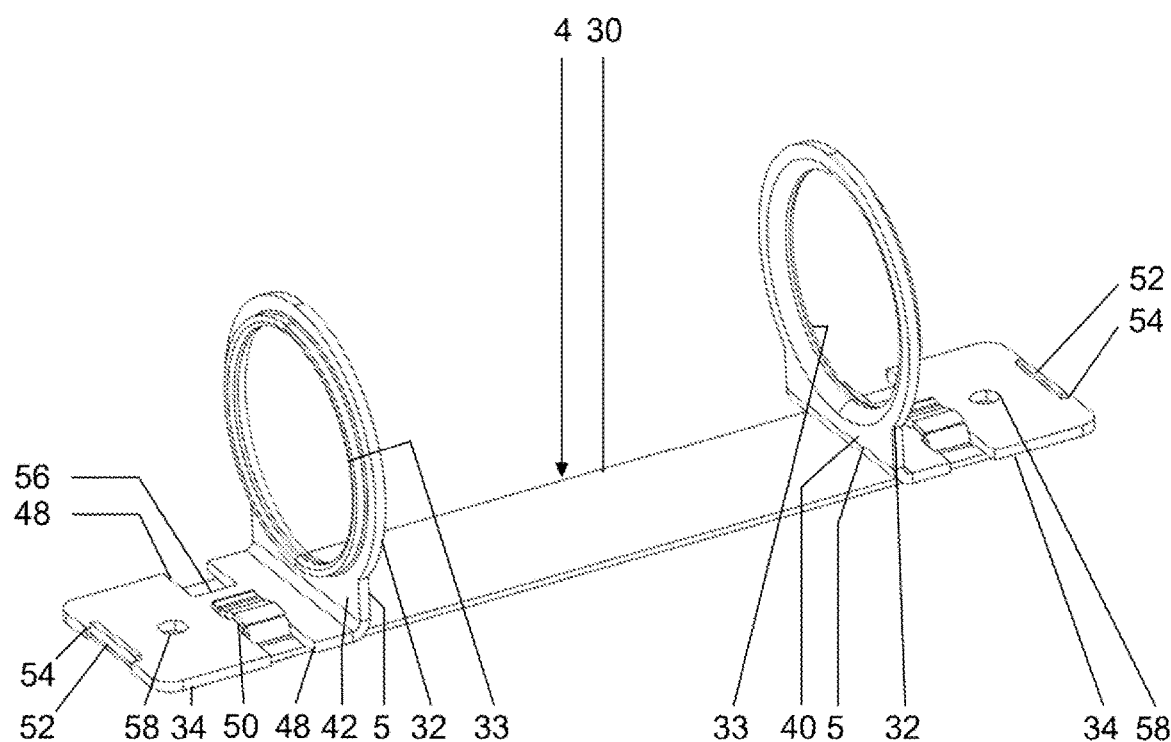
Figure 9:
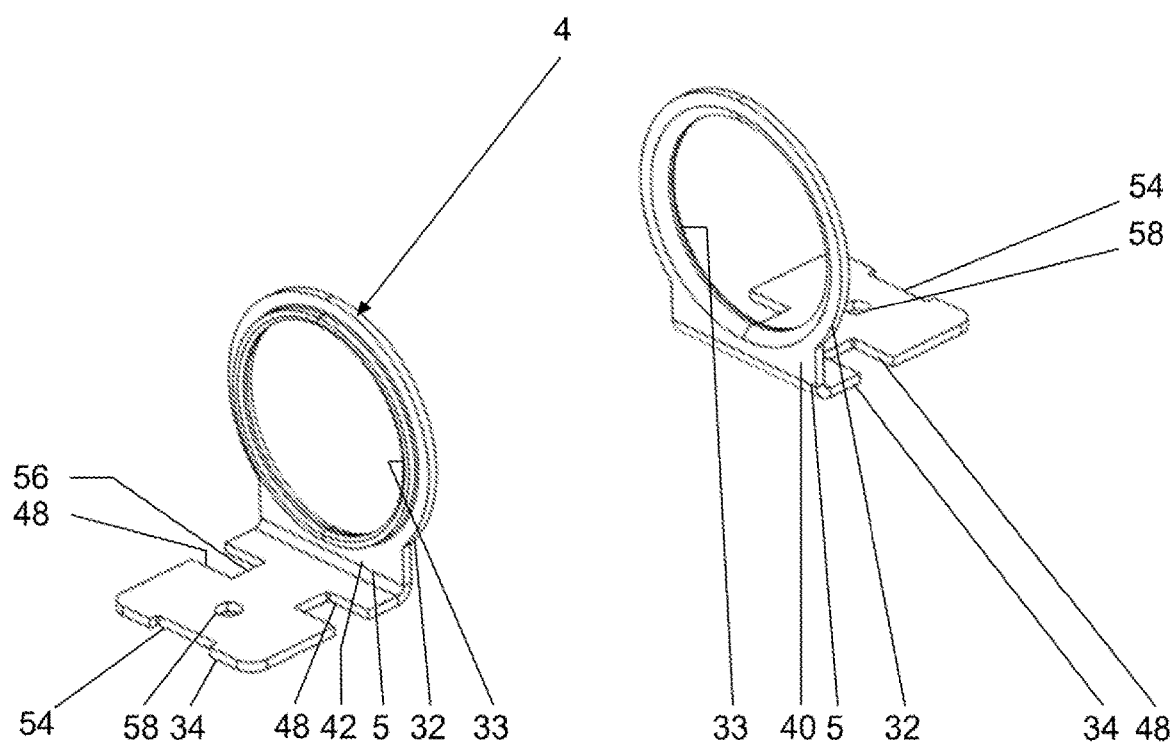
Figure 10:
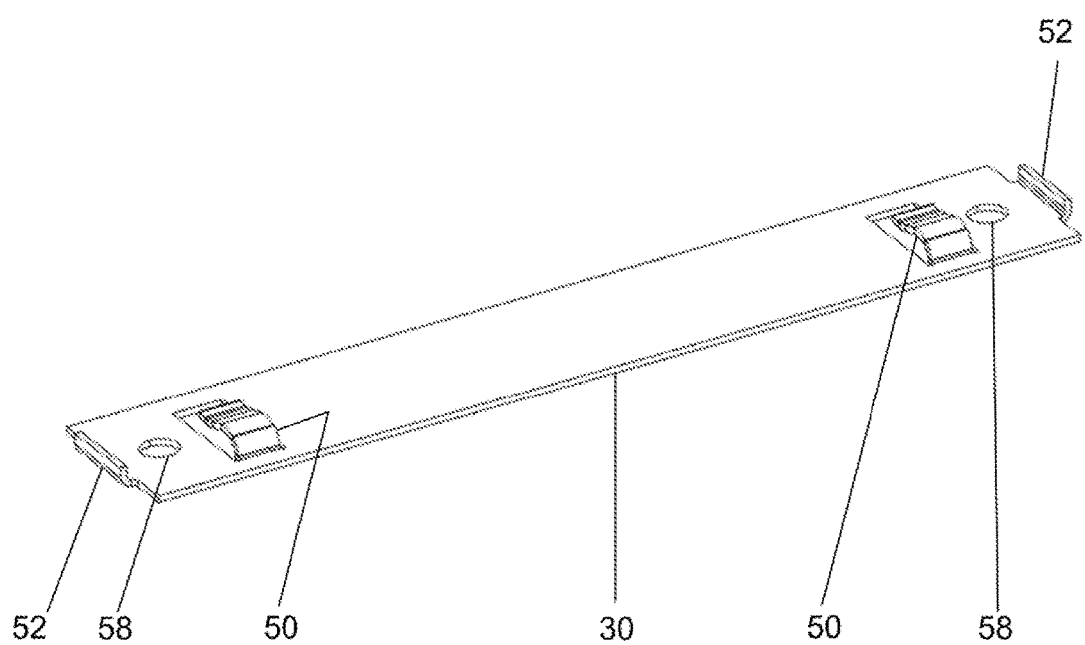
Figure 11:
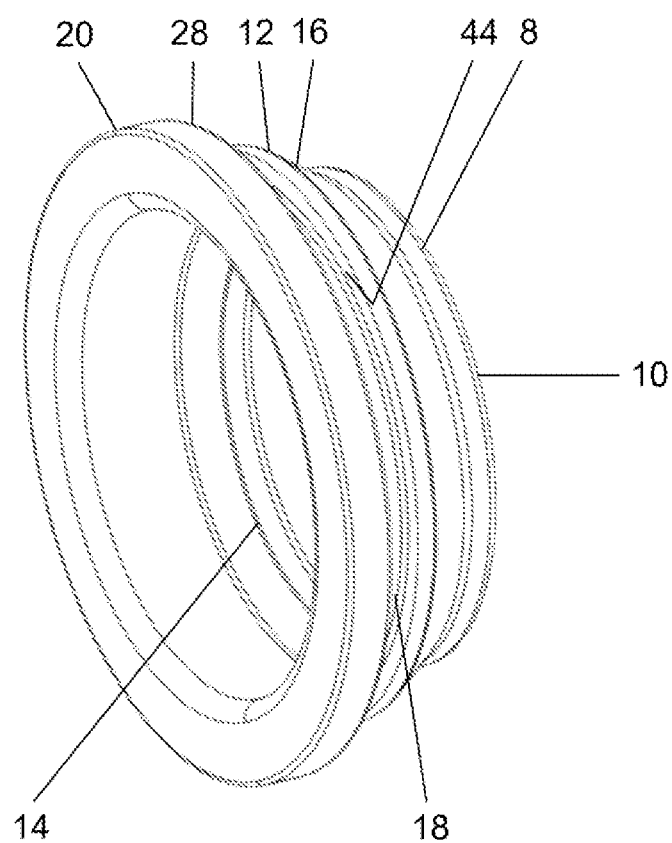
Figure 12:
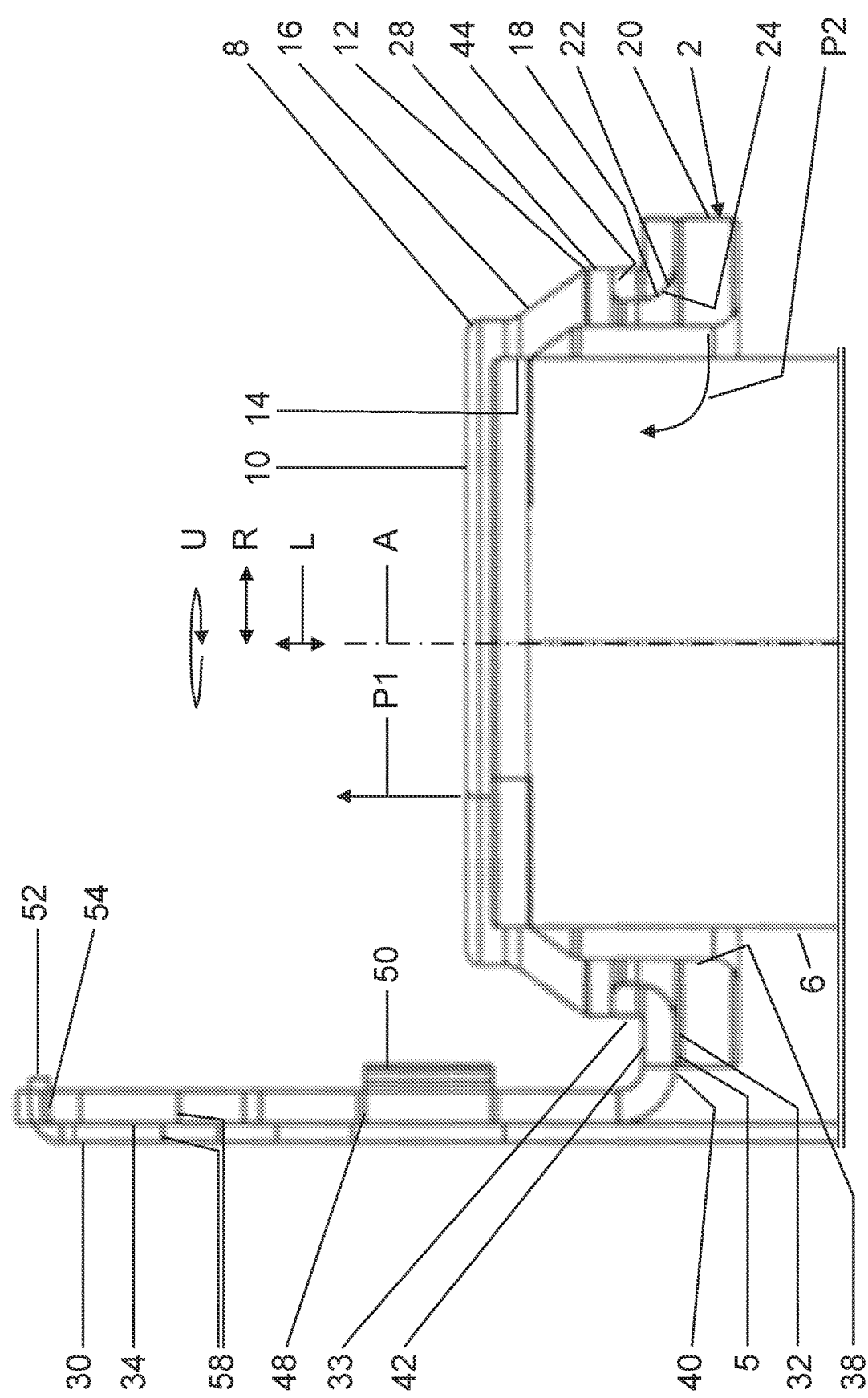
Figure 13:
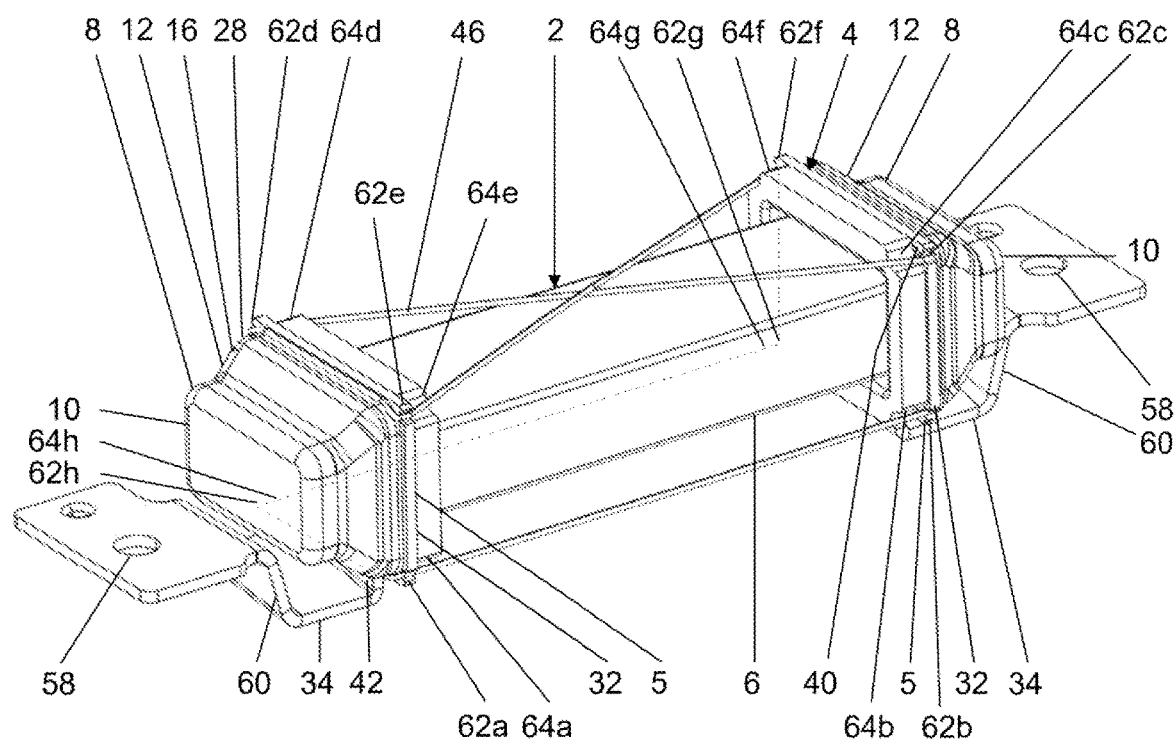
Figure 14:
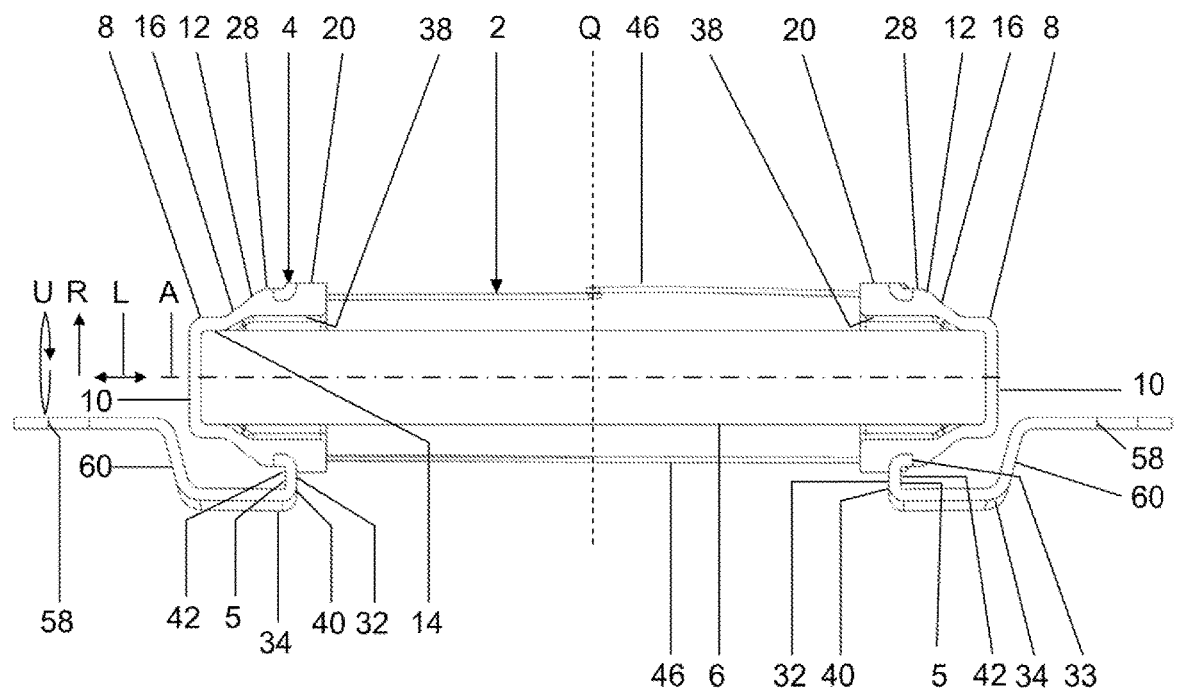
Figure 15:
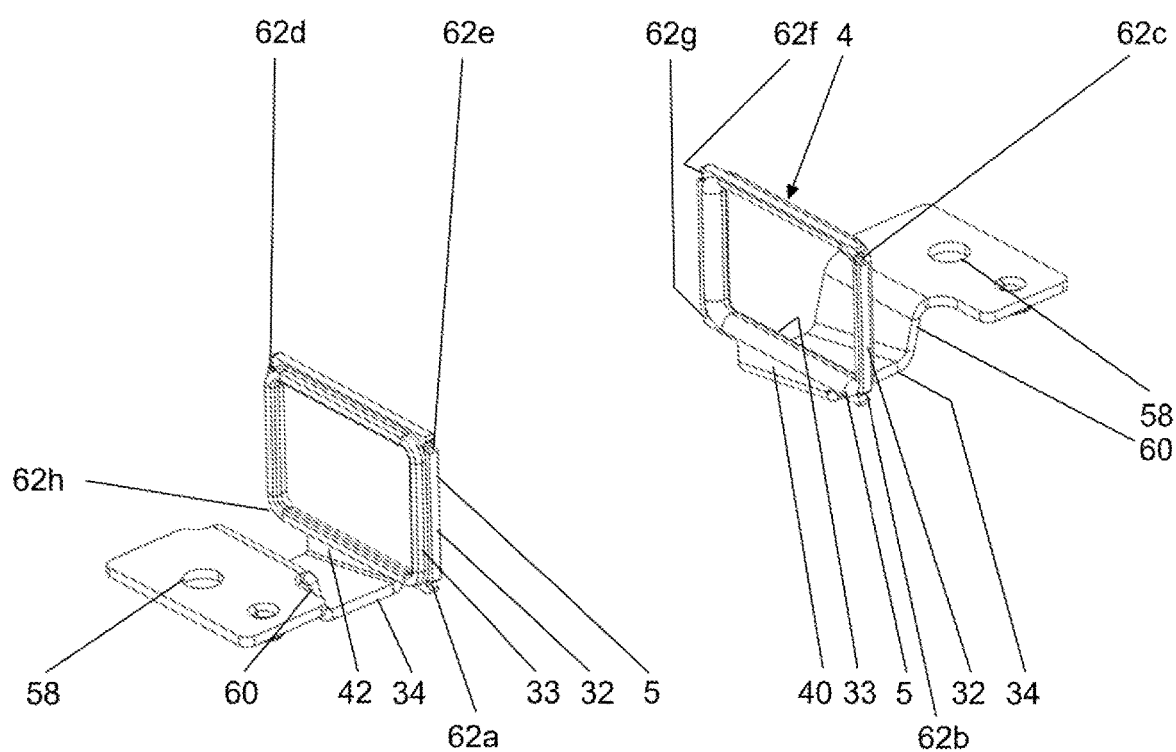
Figure 16:
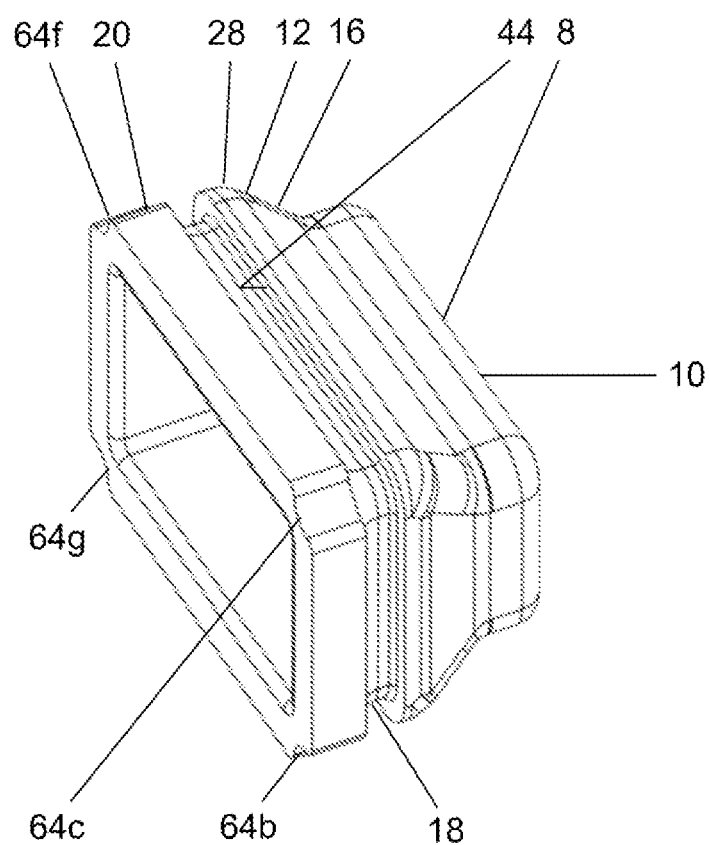
Figure 17:
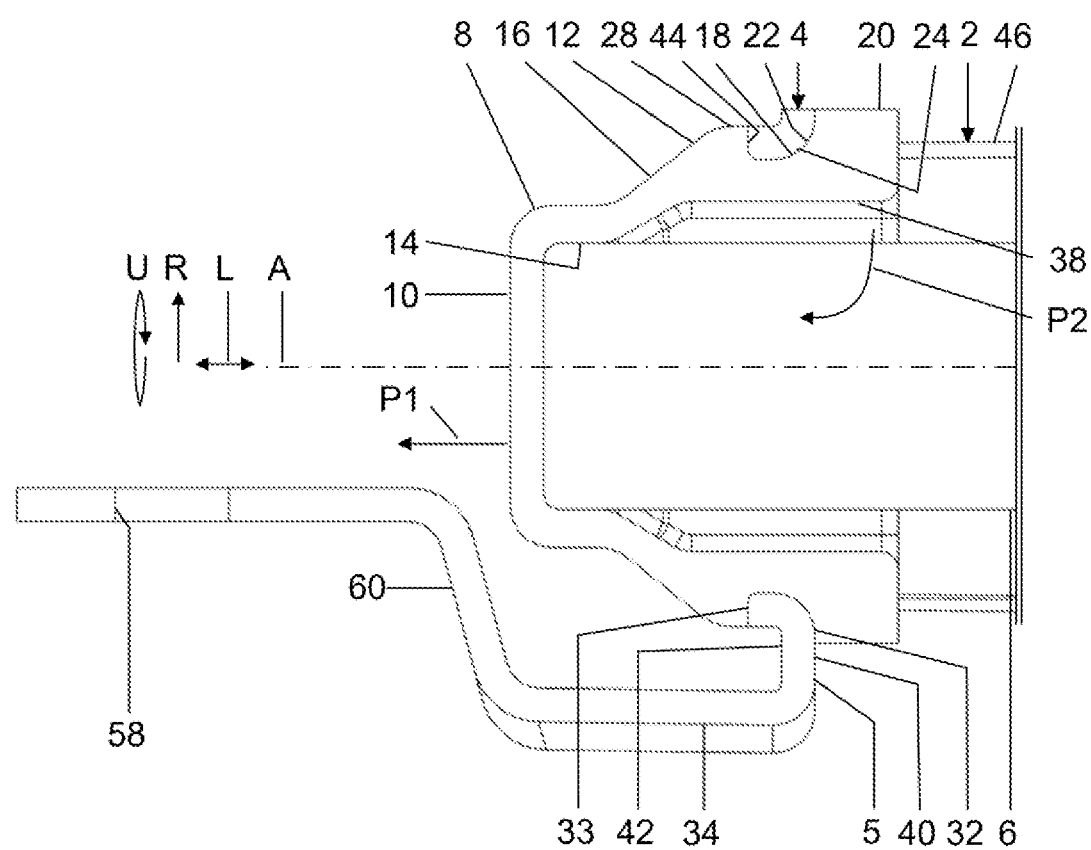

FIG. 1 shows a perspective view of a vibration damper according to a first embodiment, FIG. 2 shows a longitudinal sectional view through the vibration damper according to FIG. 1, FIG. 3 shows a perspective view of a retention apparatus according to FIG. 1, FIG. 4 shows a perspective view of an elastomer spring according to FIG. 1, FIG. 5 shows a detailed view from FIG. 2, FIG. 6 shows a perspective view of a vibration damper according to a second embodiment, FIG. 7 shows a longitudinal sectional view through the vibration damper according to FIG. 6, FIG. 8 shows a perspective view of a retention apparatus according to FIG. 6, FIG. 9 shows another perspective view of the retention apparatus according to FIG. 6, FIG. 10 shows a perspective view of a carrier plate according to FIG. 6, FIG. 11 shows a perspective view of an elastomer spring according to FIG. 6, FIG. 12 shows a detailed view from FIG. 7, FIG. 13 shows a perspective view of a vibration damper according to a third embodiment, FIG. 14 shows a longitudinal sectional view through the vibration damper according to FIG. 13, FIG. 15 shows a perspective view of the retention apparatus according to FIG. 13, FIG. 16 shows a perspective view of an elastomer spring according to FIG. 13, and FIG. 17 shows a detailed view from FIG. 14.

In the Figures, elements which are the same or which correspond to each other are indicated using the same reference numerals and are therefore not described again unless advantageous. Previously described features are not described again in order to avoid repetition and can be applied to all elements with the same or mutually corresponding reference numerals unless explicitly excluded. The disclosures contained in the entire description can be transferred accordingly to the same members with the same reference numerals or the same component designations. The positional indications which are selected in the description, such as, for example, top, bottom, lateral, etc., are also in relation to the directly described and illustrated Figure and may be transferred to the new position accordingly in the event of a change of position. Furthermore, individual features or combinations of features from the different embodiments shown and described can also constitute solutions which are independent per se, inventive or according to the invention.

FIGS. 1 to 5 show a vibration damper 2 in a preassembly state and the components thereof according to a first embodiment. The vibration damper 2 may serve to damp vibrations of a motor vehicle component, such as a rear flap or a roof of a motor vehicle.

The vibration damper 2 may be passed through by a transverse center plane Q and may comprise a retention apparatus 4 which can be fixed to a motor vehicle component. The retention apparatus 4 may have two plate-like and annular receptors 5 which may be in the form of receiving lugs 32. Each receptor 5 may be an independent portion of an L-shaped angled member, wherein the base line (according to typography) of the "L" forms the receiving lug 32 with a receiving lug recess which is circular in cross section and the arm (according to typography) of the "L" forms a leg 34 which projects in the longitudinal direction from the receptor 5. Each receiving lug 32 may comprise an annular portion 33 which extends in the longitudinal direction L and which ensures an abutment face for the elastomer spring 8.

Each leg 34 may have two bores 58 for guiding through a fixing element, for example, a screw. Each leg 34 may further have an axial stop lip 36 which extends in the direction of a longitudinal axis A. Each leg 34 may be tilted through an angle α with respect to the longitudinal axis A. Each of the receptors 5 may have an inner side 40 which faces the transverse center plane Q and an outer side 42 which faces away from the transverse center plane Q.

The two receptors 5 may be directly connected by an integral carrier plate 30. The two receptors 5 and the carrier plate 30 may be produced in one piece or configured monolithically. The same applies to the legs 34.

The vibration damper 2 may further comprise a monolithic damper mass 6 which is passed through centrally by longitudinal axis A. The damper mass 6 may be in the form of a cylinder with a consistent diameter along the longitudinal axis A. Furthermore, the damper mass 6 may have planar front sides. The damper mass 6 may project through both receiving lugs 32 so as to form a radial spacing which surrounds the damper mass 6 in a circumferential direction U or a free space 38 which may be a circular ring-shaped free space. The damper mass 6 can be redirected freely in the radial direction R inside the receiving lugs 32. The receiving lugs 32 may be orientated coaxially relative to the damper mass. It can further be seen that the receiving lugs 32 may be greater than or have a greater internal diameter than the damper mass 6 at the maximum cross sectional extent thereof.

The vibration damper 2 may further comprise two elastomer springs 8, wherein the elastomer springs 8 couple the damper mass 6 to the receptors 5 with an ability to oscillate. One of the elastomer springs 8 may be associated with each receptor 5. Each elastomer spring 8 may have a front side portion 10 which may be constructed in accordance with the cross sectional shape of the damper mass 6, for example, to be circular. The front side portion 10 may adjoin the front side of the damper mass 6. A circumferential side portion 14 which may be arranged in a surrounding manner relative to the damper mass 6 in a radial direction R may adjoin the front side portion 10. The circumferential side portion 14 may follow the circumferential face of the damper mass 6 in the circumferential direction U, therefore it may be a circular annulus. The circumferential side portions 14 may fix the damper mass 6 in the transverse or radial direction R. Each elastomer spring 8 may be pressed onto the damper mass by means of the front side portion 10 and circumferential side portion 14. Consequently, the elastomer springs 8 may engage over the damper mass 6 in a manner of a cover by means of the front side portion 10 and circumferential side portion 14. Each of the elastomer springs 8 may further comprise a connection portion 12 between the damper mass 6 and the respective receptor 5. The connection portion 12 of each elastomer spring 8 may be externally arranged with respect to the respective receptor 5 or the outer side 42 thereof. The hollow-cylindrical connection portion 12 may surround the damper mass 6 at the circumference, wherein the damper mass 6 may be completely covered by the elastomer spring 8 between the front side and the receptor 5, respectively.

The respective connection portion 12 may be configured in a hollow-cylindrical manner, wherein it may partially have an increasing internal diameter in the direction of the outer side 42 of the respective receptor 5. This portion can also be designated as a radial spacing portion 16. In this radial spacing portion 16, the external diameter may also increase in order to maintain a consistent wall thickness. The radial spacing portion 16 may extend in a manner tilted relative to the longitudinal axis A in longitudinal section.

For coupling to the receptors 5, each elastomer spring 8 may comprise a coupler which may be in the form of a circumferential groove 18 at the external circumference. The coupler may be arranged in the radial direction R between the receptors 5 and the damper mass 6, wherein the elastomer portion at the internal circumference with respect to the circumferential groove 18 may act as a radial stop for the damper mass 6. The receptors 5 may engage in the circumferential groove 18 via the receiving lug 32 in the manner of a flange and with an annular portion 33.

Each elastomer spring 8 may have a first flange 20, against which the respective receptor 5 may adjoin. The first flange 20 may have a side wall 22 which increases in terms of diameter in the direction of the transverse center plane Q. The respective receptor 5 may have a corresponding contour in the abutment region 24 which may abut the side wall 22. The first flange 20 may be an annular flange at the external circumference. A side wall 22 which may be configured in this manner can deform the elastomer spring 8 in the event of an axial displacement of the damper mass 6 in the direction of the first arrow P1 in such a manner that the first flange 20 may be bent radially inwardly in the direction of the second arrow P2, where it may form a radial stop and reduce a radial deflection path of the damper mass 6. The first flange 20 may have a planar flat portion 26 which may be at the external circumference and which may reduce a radial extent of the first flange 20 with respect to circumferentially adjacent portions of the first flange 20.

Each elastomer spring 8 may further have a second flange 28, against which the respective receptor 5 may also adjoin, wherein the second flange 28 may have a side wall 44 which extends in a radial direction R and against which the receptor 5 may be supported via the annular portion 33 in a longitudinal direction L. The side wall 44 may extend parallel with the transverse center plane Q. The second flange 28 may be an annular flange at the external circumference. It can be seen that the circumferential groove 18 may be formed by the first flange 20 and the second flange 28 and may be delimited in the longitudinal direction L.

FIGS. 6 to 12 show a vibration damper 2 in a preassembly state and the components thereof according to a second embodiment. In order to avoid repetition, only differences from the first embodiment are intended to be described below.

The legs 34 now do not have an axial stop lip 36, although such a lip may be provided. Each leg 34 comprises two clamping recesses 48 which extend in a transverse direction with respect to the longitudinal axis A. The two clamping recesses 48 of a leg 34 may be aligned with each other and may be separated from each other by a clamping bridge 56. The clamping bridge 56 may be formed by the respective leg 34. Each leg 34 may further comprise a locking recess 54, wherein the locking recess 54 may extend in the transverse direction with respect to the longitudinal axis A. The two legs 34 may be tilted through an angle α with respect to the longitudinal axis A, but do not have to be.

The retention apparatus 4 now does not comprise an integral carrier plate 30, but instead a separate carrier plate 30 which may be clamped and locked with respect to the legs 34. The separate carrier plate 30 may adjoin the lower sides of the legs 34 which face away from the damper mass and may comprise two clamping brackets 50 which extend in the transverse direction and in the same direction. Each of the clamping brackets 50 may be guided through a clamping recess 48 from the lower side, facing away from the damper mass, of the leg 34 to an upper side, facing the damper mass, of the leg 34, respectively. At that location, each clamping bracket 50 may clamp with respect to a leg 34 or with respect to the clamping bridge 56 thereof. The separate carrier plate 30 may further comprise at the end a locking projection 52 which extends in the transverse direction. Each locking projection 52 may lock with the locking recess 54, respectively. The clamping brackets 50 may retain the legs 34 and consequently also the receptors 5 on the separate carrier plate 30 and the locking projections 52 may prevent the legs 34 and consequently also the receptors 5 from slipping. The elastomer springs 8 may not have any flat portion 26, wherein this may absolutely be provided. Bores 58 which are aligned with the bores 58 of the legs 34 may be configured in the carrier plate 30.

FIGS. 13 to 17 show a vibration damper 2 in a preassembly state and the components thereof according to a third embodiment. In order to avoid repetition, only differences from the first embodiment are intended to be described below.

The legs 34 now have an axial stop wall 60 instead of axial stop lips 36. This wall may be produced in that the axial stop wall 60 projects angularly from the leg 34, such as while defining an angle in the range from 100° to 120°. A portion which comprises the bores 58 again projects therefrom.

The damper mass 6 is now in the form of a parallelepiped, but may further comprise planar front sides. The receiving lugs 32 may now be rectangular, wherein the damper mass 6 and the receiving lugs 32 may be adapted to each other in such a manner that the damper mass 6 cannot rotate very far inside the receiving lugs 32 about the longitudinal axis A, but may be limited therein by the receiving lugs 32. The two elastomer springs 8 may also be adapted to the parallelepipedal shape of the damper mass 6 and the rectangular shape of the receiving lugs 32 and the receiving lug recess which is rectangular in cross section, and constructed in a hollow-parallelepipedal manner. The same may apply to the flange 33.

The two legs 34 or receptors 5 may not be connected to a carrier plate. However, they may be tensioned by means of a cable 46 which may be a ring cable. The cable 46 may be guided in eight guide recesses 62a-h of the receptors 5, wherein it is illustrated with broken lines in the concealed regions for the sake of comprehension. The extent of the cable 46 may be such that it leads through a guide recess 62a of one receptor 5 into a guide recess 62b of the other receptor 5. From there, it may be guided in the plane of the image upwardly through an additional guide recess 62c and from there back into the other receptor 5 and the guide recess 62 thereof. From there, it may extend through an additional guide recess 62e and again into the other receptor 5 and the guide recess 62f thereof. The extents of the cable 46 between the guide recesses 62c and 62d, on the one hand, and the guide recesses 62e and 62f intersect each other. From the guide recess 62f, the cable 46 may be guided downwardly in the plane of the image and may extend through a guide recess 62g and a guide recess 62h. It can further be seen that the elastomer springs 8 also may have guide recesses 64a-h which may be aligned with the respective guide recesses 62a-h in the longitudinal direction L and through which the cable 46 may lead.

An operating method of the vibration damper 2 is explained below. The vibrations of a motor vehicle component which is connected to the vibration damper 2 may be transmitted via the retention apparatus 4 and the elastomer springs 8 to the damper mass 6. The damper mass 6 may be thereby redirected relative to the retention apparatus 4 and may begin to oscillate, wherein the vibrations may be damped via the two elastomer springs 8 and thus may be decoupled from the passenger compartment. No disruptive rattling sounds from the motor vehicle component may thereby be perceived in the passenger compartment. In place of a pin element, the damper mass 6 may limit acting as a path limiting device the individual redirection relative to the retention apparatus 4 by striking against the elastomer springs 8 which may be arranged inside the receiving lugs 32. An overload of the elastomer springs 8 may thereby be actively prevented so that the vibration damper 2 may have a longer service-life. Furthermore, the elastomer springs 8 which may be arranged inside the receiving lugs 32 may damp the noise which may be produced when striking the damper mass 6.

The invention is not limited to the above-described embodiments but instead may be modified in various manners. All the features and advantages which arise from the claims, description and drawings, including constructive details, spatial arrangements and method steps, may be inventively significant both per se and in extremely varied combinations.

All combinations comprising at least two of the features disclosed in the description, claims and/or Figures are included within the scope of the invention.

In order to avoid repetition, features which are disclosed according to the apparatus are also intended to be considered to be disclosed according to the method and to be able to be claimed. Similarly, features which are disclosed according to the method are also intended to be considered to be disclosed according to the apparatus and to be able to be claimed.

What is claimed:

1. A vibration damper for damping vibrations of a motor vehicle component, comprising:
    a transverse center plane;
    a retention apparatus configured to be fixed to said motor vehicle component, the retention apparatus having a first receptor and a second receptor, each receptor having an inner side facing the transverse center plane and an outer side facing away from the transverse center plane;
    a damper mass having a central longitudinal axis; and
    a first elastomer spring and a second elastomer spring, the first elastomer spring and the second elastomer spring comprise separate components;
    wherein the first elastomer spring and the second elastomer spring couple the damper mass to the first receptor and the second receptor, respectively, with an ability to vibrate;
    wherein at least one of the first elastomer spring and the second elastomer spring is predominantly outside of the respective receptor and has a connection portion, between the damper mass and respective receptor, and the connection portion predominantly extends outwardly longitudinally beyond an outer side of the respective receptor;
    wherein each of the first elastomer spring and the second elastomer spring has a first flange, against which the respective receptor abuts, wherein the first flange has a side wall with a curved portion, and the respective receptor has a corresponding contour in an abutment region that adjoins the side wall; and
    wherein the first flange has, at an external circumference, a flat portion that reduces a radial extent of the first flange with respect to portions of the first flange that are adjacent at the external circumference.

2. The vibration damper as claimed in claim 1, wherein the first receptor and the second receptor are each in a form of a receiving lug, wherein the damper mass projects through at least one receiving lug in a longitudinal direction to form a radial spacing.

3. The vibration damper as claimed in claim 1, wherein each elastomer spring has a front side portion for abutting against a front side of the damper mass and the connection portion that projects therefrom in a direction of the transverse center plane to couple to the respective receptor.

4. The vibration damper as claimed in claim 1, wherein each elastomer spring has a circumferential side portion that is arranged in a radial direction to surround the damper mass and/or to connect the damper mass.

5. The vibration damper as claimed in claim 1, wherein the connection portion is partially funnel-shaped and has an internal diameter which increases, at least partially, in a direction of the outer side of the respective receptor.

6. The vibration damper as claimed in claim 1, wherein the connection portion has a coupler comprising a circumferential groove for coupling to the respective receptor, and the coupler is arranged between the respective receptor and the damper mass in a radial direction.

7. The vibration damper as claimed in claim 1, wherein each elastomer spring has a second flange, against which the respective receptor adjoins, and wherein the second flange has a side wall that extends in a radial direction and against which the receptor is supported in a longitudinal direction.

8. The vibration damper as claimed in claim 1, wherein the retention apparatus has no structure that connects the first receptor and the second receptor to each other.

9. The vibration damper as claimed in claim 1, wherein a carrier plate connects the first receptor and the second receptor, the carrier plate is either constructed integrally with the first receptor and the second receptor or is constructed separately therefrom and is connected thereto.

10. The vibration damper as claimed in claim 9, wherein the carrier plate is connected to the first receptor and the second receptor via form-fitting and/or press-fitting.

11. The vibration damper as claimed in claim 1, wherein the retention apparatus has at least one cable that tensions the first receptor and the second receptor with respect to each other.

12. The vibration damper as claimed in claim 1, wherein a leg that projects in a longitudinal direction is arranged on at least one of the first receptor and the second receptor.

13. The vibration damper as claimed in claim 12, wherein the leg (i) extends in a manner tilted through an angle with respect to the longitudinal axis and/or (ii) has an axial stop lip that projects from the respective leg and/or (iii) has at least one clamping recess for introducing a clamping bracket and/or (iv) has at least one locking recess for receiving a locking projection.

14. A vibration damper for damping vibrations of a motor vehicle component, comprising:
a transverse center plane;
a retention apparatus configured to be fixed to said motor vehicle component, the retention apparatus having a first receptor and a second receptor, each receptor having an inner side facing the transverse center plane and an outer side facing away from the transverse center plane;
a damper mass having a central longitudinal axis; and
a first elastomer spring and a second elastomer spring,
wherein the first elastomer spring and the second elastomer spring couple the damper mass to the first receptor and the second receptor, respectively, with an ability to vibrate;
wherein at least one of the first elastomer spring and the second elastomer spring has a connection portion, between the damper mass and respective receptor, the connection portion predominantly extends outwardly longitudinally beyond an outer side of the respective receptor;
wherein each of the first elastomer spring and the second elastomer spring has a first flange, against which the respective receptor abuts, wherein the first flange has a side wall with a curved portion, and the respective receptor has a corresponding contour in an abutment region that adjoins the side wall; and
wherein the first flange has, at an external circumference, a flat portion that reduces a radial extent of the first flange with respect to portions of the first flange that are adjacent at the external circumference.

15. The vibration damper as claimed in claim 14,
wherein each of the first elastomer spring and the second elastomer spring extend predominantly on an outside of the respective receptor.

* * * * *